(12) United States Patent
Yu et al.

(10) Patent No.: US 12,504,588 B2
(45) Date of Patent: Dec. 23, 2025

(54) SEMICONDUCTOR DEVICE AND METHODS OF MANUFACTURE

(71) Applicant: Taiwan Semiconductor Manufacturing Co., Ltd., Hsinchu (TW)

(72) Inventors: Chen-Hua Yu, Hsinchu (TW); Chuei-Tang Wang, Taichung (TW); Chia-Chia Lin, Kaohsiung (TW); Chung-Hao Tsai, Huatan Township (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 332 days.

(21) Appl. No.: 18/155,131

(22) Filed: Jan. 17, 2023

(65) Prior Publication Data
US 2024/0241316 A1   Jul. 18, 2024

(51) Int. Cl.
*G02B 6/12* (2006.01)
*G02B 6/13* (2006.01)
*G02B 6/42* (2006.01)
*G02B 6/43* (2006.01)
*H01L 23/00* (2006.01)
*H01L 25/16* (2023.01)
*H04B 10/50* (2013.01)

(52) U.S. Cl.
CPC ........... *G02B 6/42* (2013.01); *G02B 6/12002* (2013.01); *G02B 6/13* (2013.01); *G02B 6/43* (2013.01); *H01L 24/08* (2013.01); *H01L 24/80* (2013.01); *H01L 25/167* (2013.01); *H04B 10/50* (2013.01)

(58) Field of Classification Search
CPC ......... G02B 6/12002; G02B 6/42; G02B 6/43
See application file for complete search history.

(56) References Cited

U.S. PATENT DOCUMENTS

| | | | | |
|---|---|---|---|---|
| 6,243,509 | B1* | 6/2001 | Chen | G02B 6/43 385/129 |
| 9,715,064 | B1* | 7/2017 | Gambino | G02B 6/43 |
| 10,333,623 | B1 | 6/2019 | Liao et al. | |
| 10,690,845 | B1 | 6/2020 | Jacob et al. | |
| 2004/0206988 | A1* | 10/2004 | Glebov | G02B 6/43 257/244 |
| 2005/0276604 | A1* | 12/2005 | Morrow | H04J 14/0241 398/73 |
| 2006/0056756 | A1* | 3/2006 | Uchida | G02B 6/43 385/14 |
| 2009/0103855 | A1* | 4/2009 | Binkert | G02B 6/43 257/E21.598 |
| 2014/0268980 | A1* | 9/2014 | Kim | G11C 5/025 438/69 |

(Continued)

FOREIGN PATENT DOCUMENTS

TW          202002168 A        1/2020

*Primary Examiner* — Michael Stahl
(74) *Attorney, Agent, or Firm* — Slater Matsil, LLP

(57) ABSTRACT

An optical interposer is utilized in order to send and receive signals from external sources such as an optical fiber. The optical interposer receives the signals, routes the signals to various attached components, and when desired, converts the signals between optical and electrical signals. The various attached components may include memory devices such as a high bandwidth memory, processing components, such as an xPU, combinations of these, or the like.

20 Claims, 8 Drawing Sheets

(56) References Cited

U.S. PATENT DOCUMENTS

| | | | |
|---|---|---|---|
| 2014/0270785 A1* | 9/2014 | Kim | H04B 10/801 |
| | | | 398/115 |
| 2014/0294342 A1* | 10/2014 | Offrein | G02B 6/4214 |
| | | | 385/14 |
| 2016/0142155 A1* | 5/2016 | Kim | H04B 10/803 |
| | | | 398/141 |
| 2017/0199328 A1* | 7/2017 | Shubin | G02B 6/1228 |
| 2018/0224601 A1* | 8/2018 | Low | H05K 1/144 |
| 2020/0200970 A1 | 6/2020 | Ahn | |
| 2021/0258078 A1* | 8/2021 | Meade | G11C 11/4096 |
| 2021/0271020 A1* | 9/2021 | Islam | H01L 25/105 |
| 2022/0091349 A1* | 3/2022 | Testa | G02B 6/124 |
| 2022/0291465 A1* | 9/2022 | Bernabe | G02B 6/4212 |
| 2022/0404545 A1 | 12/2022 | Winterbottom et al. | |
| 2024/0077670 A1* | 3/2024 | Tseng | G02B 6/43 |
| 2024/0353614 A1* | 10/2024 | Bunandar | G02B 6/12002 |

\* cited by examiner

SEMICONDUCTOR DEVICE AND METHODS OF MANUFACTURE

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating long-range optical components and short-range electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
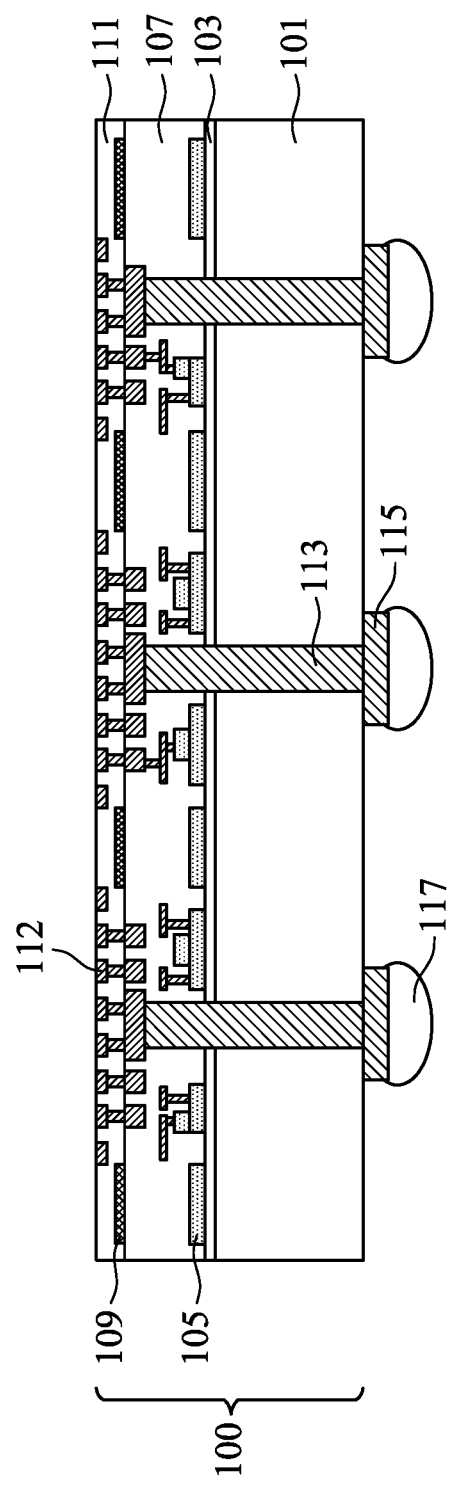
FIG. 1 illustrates an optical interposer, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments of the ideas presented herein will now be described with respect to particular embodiments in which a photonic interposer is utilized to provide an inter/intra system optical engine (OE) that provides optical and electrical interconnections between multiple semiconductor devices. The embodiments presented, however, are not intended to limit the ideas, as the ideas may be implemented in any suitable embodiments, and all such embodiments are fully intended to be included within the scope of the ideas.

With reference now to FIG. 1, there is illustrated a formation of an optical interposer 100, in accordance with some embodiments. In the particular embodiment illustrated in FIG. 1, the optical interposer 100 in a photonic integrated circuit (PIC) and comprises a first substrate 101, an insulator layer 103, a first active layer 105 of optical components, first metallization layers 107, a second active layer 109 of optical components, first bonding layers 111, first bond pads 112 (e.g., external electrical connections), through substrate vias 113, contact pads 115, and first external connectors 117. In an embodiment, at a beginning of the manufacturing process of the optical interposer 100, the first substrate 101, the insulator layer 103, and the first active layer 105 of optical components may collectively be part of a silicon-on-insulator (SOI) substrate. Looking first at the first substrate 101, the first substrate 101 may be a semiconductor material such as silicon or germanium, a dielectric material such as glass, or any other suitable material that allows for structural support of overlying devices and also allows for the formation of interconnections between sides of the first substrate 101 (as described further below).

The insulator layer 103 may be a dielectric layer that separates the first substrate 101 from the overlying first active layer 105 and can additionally serve as a portion of cladding material that surrounds subsequently manufactured optical components (discussed further below). In an embodiment the insulator layer 103 may be silicon oxide, silicon nitride, germanium oxide, germanium nitride, combinations of these, or the like, formed using a method such as implantation (e.g., to form a buried oxide (BOX) layer) or else may be deposited onto the first substrate 101 using a deposition method such as chemical vapor deposition, atomic layer deposition, physical vapor deposition, combinations of these, or the like. However, any suitable material and method of manufacture may be used.

The material for the first active layer 105 is initially (prior to patterning) a conformal layer of material that will be used to begin manufacturing the first active layer 105 of optical components. In an embodiment the material for the first active layer 105 may be a translucent material that can be used as a core material for the desired optical components, such as a semiconductor material such as silicon, germanium, silicon nitride, combinations of these, or the like. In embodiments in which the material of the first active layer 105 is deposited, the material for the first active layer 105 may be deposited using a method such as epitaxial growth, chemical vapor deposition, atomic layer deposition, physical vapor deposition, combinations of these, or the like. In other embodiments in which the insulator layer 103 is formed using an implantation method, the material of the first active layer 105 may initially be part of the first substrate 101 prior to the implantation process to form the insulation layer 103. However, any suitable materials and methods of manufacture may be utilized to form the material of the first active layer 105.

Once the material for the first active layer 105 is present, the optical components for the first active layer 105 are manufactured using the material for the first active layer 105. In embodiments the optical components of the first active layer 105 may include such components as optical waveguides (e.g., ridge waveguides, rib waveguides, buried channel waveguides, diffused waveguides, etc.), couplers (e.g., grating couplers, edge couplers, etc.), optical switches (e.g., Mach-Zehnder silicon-photonic switches, microelectromechanical switches, micro-ring resonators, etc.), amplifiers, multiplexors, demultiplexors, optical-to-electrical converters (e.g., P-N junctions), electrical-to-optical converters, lasers, combinations of these, or the like. However, any suitable optical components may be used.

To begin forming the first active layer 105 of optical forming from the initial material, the material for the first active layer 105 may be patterned into the desired shapes for the first active layer 105 of optical components. In an embodiment the material for the first active layer 105 may be patterned using, e.g., photolithographic masking and etching processes. However, any suitable method of patterning the material for the first active layer 105 may be utilized.

For some of the optical components, such as waveguides or edge couplers, the patterning process may be all or at least most of the manufacturing that is used to form these components. Additionally, for those components that utilize further manufacturing processes, such as Mach-Zehnder silicon-photonic switches that utilize resistive heating elements, additional processing may be performed either before or after the patterning of the material for the first active layer 105. For example, implantation processes, additional deposition and patterning processes for different materials (e.g., resistive heating elements), combinations of all of these processes, or the like, can be utilized to help further the manufacturing of the various desired optical components. All such manufacturing processes and all suitable optical components may be manufactured, and all such combinations are fully intended to be included within the scope of the embodiments.

Once the optical components of the first active layer 105 have been manufactured, the first metallization layers 107 are formed in order to electrically connect the first active layer 105 of optical components to control circuitry, to each other, and to subsequently attached devices (not illustrated in FIG. 1 but illustrated and described further below with respect to FIGS. 2A-2B). In an embodiment the first metallization layers 107 are formed of alternating layers of dielectric and conductive material and may be formed through any suitable processes (such as deposition, damascene, dual damascene, etc.). In particular embodiments there may be multiple layers of metallization used to interconnect the various optical components, but the precise number of first metallization layers 107 is dependent upon the design of the optical interposer 100.

After the first metallization layers 107 are formed, the second active layer 109 of optical components are formed. In embodiments the optical components of the second active layer 109 may include such components as couplers (e.g., edge couplers, grating couplers, etc.) for connection to outside signals (not illustrated in FIG. 1 but illustrated and described further below with respect to FIGS. 2A-2B), optical waveguides (e.g., ridge waveguides, rib waveguides, buried channel waveguides, diffused waveguides, etc.), optical switches (e.g., Mach-Zehnder silicon-photonic switches, microelectromechanical switches, micro-ring resonators, etc.), amplifiers, multiplexors, demultiplexors, optical-to-electrical converters (e.g., P-N junctions), electrical-to-optical converters, lasers, combinations of these, or the like. However, any suitable optical components may be used.

In an embodiment the second active layer 109 of optical components may be formed by initially depositing a material for the second active layer 109 over the first metallization layers 107. In an embodiment the material for the second active layer 109 may be a dielectric material such as silicon nitride, silicon oxide, combinations of these, or the like, deposited using a deposition method such as chemical vapor deposition, atomic layer deposition, physical vapor deposition, combinations of these, or the like. However, any suitable material and any suitable method of deposition may be utilized.

Once the material for the second active layer 109 has been deposited or otherwise formed, the material may be patterned into the desired shapes for the desired optical components. In an embodiment the material of the second active layer 109 may be patterned using, e.g., a photolithographic masking and etching process. However, any suitable method of patterning the material for the second active layer 109 may be utilized.

For some of the optical components, such as waveguides or edge couplers, the patterning process may be all or at least most manufacturing that is used to form these components. Additionally, for those components that utilize further manufacturing processes, such as Mach-Zehnder silicon-photonic switches that utilize resistive heating elements, additional processing may be performed either before or after the patterning of the material for the second active layer 109. For example, implantation processes, additional deposition and patterning processes for different materials, combinations of all of these processes, or the like, and can be utilized to help further the manufacturing of the various desired optical components. All such manufacturing processes and all suitable optical components may be manufactured, and all such combinations are fully intended to be included within the scope of the embodiments.

Once the optical components of the second active layer 109 have been manufactured, the first bonding layers 111 are formed over the optical components of the second active layer 109. In an embodiment, the first bonding layers 111 may be used for fusion bonding (also referred to as oxide-to-oxide bonding) or as part of a hybrid bond (described further below with respect to FIGS. 2A-2B). In accordance with some embodiments, the first bonding layers 111 are formed of a silicon-containing dielectric material such as silicon oxide, silicon nitride, or the like. The first bonding layers 111 may be deposited using any suitable method, such as CVD, high-density plasma chemical vapor deposition (HDPCVD), PVD, atomic layer deposition (ALD), or the like, to a thickness of between about 0.65 μm and about 6 μm, such as about 5.5 μm. However, any suitable materials, deposition processes, and thicknesses may be utilized.

Once the first bonding layers 111 have been formed, first openings in the first bonding layers 111 are formed to expose conductive portions of the underlying layers in preparation to form a bond pad via and second openings are formed in the first bonding layers 111 to widen portions of the openings in preparation for formation of first bond pads 112 within the first bonding layers 111. Once the first openings and the second openings have been formed within the first bonding layers 111, the first openings and the second openings may be filled with a seed layer and a plate metal to form the bond pad via and the first bond pads 112 within the first bonding layers 111. The seed layer may be blanket deposited over top surfaces of the first bonding layers 111 and the exposed conductive portions of the underlying layers and sidewalls of the openings and the second openings. The seed layer may comprise a copper layer. The seed layer may be deposited using processes such as sputtering, evaporation, or plasma-enhanced chemical vapor deposition (PECVD), or the like, depending upon the desired materials. The plate metal may be deposited over the seed layer through a plating process such as electrical or electro-less plating. The plate metal may comprise copper, a copper alloy, or the like. The plate metal may be a fill material. A barrier layer (not separately illustrated) may be blanket deposited over top surfaces of the first bonding layers 111 and sidewalls of the first openings and the second openings before the seed layer. The barrier layer may comprise titanium, titanium nitride, tantalum, tantalum nitride, or the like.

Following the filling of the first openings and the second openings, a planarization process, such as a CMP, is performed to remove excess portions of the seed layer and the plate metal, forming the bond pad via and the first bond pads 112 within the first bonding layers 111. In some embodiments the bond pad via is utilized to connect the first bond pads 112 with underlying conductive portions and, through the underlying conductive portions, connect the first bond pads 112 with the first active layer 105.

The optical interposer 100 additionally includes a plurality of through substrate vias (TSVs) 113 that extend through the first substrate 101 so as to provide a quick passage of power, data, and ground through the first substrate 101. In an embodiment the TSVs 113 may be formed by initially forming through silicon via openings into one or more of the first substrate 101, the insulative layer 103, and the first metallization layers 107 (depending upon which point in the manufacturing process the formation of the TSVs 113 is initiated). The TSV openings may be formed by applying and developing a suitable photoresist (not shown), and removing portions of the first substrate 101, the insulative layer 103, and the first metallization layers 107 that are exposed to the desired depth. The TSV openings may be formed so as to extend into the first substrate 101 to a depth greater than the eventual desired height of the first substrate 101.

Once the TSV openings have been formed within the first substrate 101, the TSV openings may be lined with a liner. The liner may be, e.g., an oxide formed from tetraethyl-orthosilicate (TEOS) or silicon nitride, although any suitable dielectric material may alternatively be used. The liner may be formed using a plasma enhanced chemical vapor deposition (PECVD) process, although other suitable processes, such as physical vapor deposition or a thermal process, may alternatively be used. Additionally, the liner may be formed to a thickness of between about 0.1 μm and about 5 μm, such as about 1 μm.

Once the liner has been formed along the sidewalls and bottom of the TSV openings, a barrier layer (also not independently illustrated) may be formed and the remainder of the TSV openings may be filled with first conductive material. The first conductive material may comprise copper, although other suitable materials such as aluminum, alloys, doped polysilicon, combinations thereof, and the like, may alternatively be utilized. The first conductive material may be formed by electroplating copper onto a seed layer (not shown), filling and overfilling the TSV openings. Once the TSV openings have been filled, excess liner, barrier layer, seed layer, and first conductive material outside of the TSV openings may be removed through a planarization process such as chemical mechanical polishing (CMP), although any suitable removal process may be used.

Once the TSV openings have been filled, the first substrate 101 may be thinned in order to expose the TSVs 113. In an embodiment the thinning of the first substrate 101 may be performed utilizing a planarization process such as a chemical mechanical planarization process, whereby etchants and abrasives are utilized along with a grinding platen in order to react and grind away material until a planar surface is formed and the TSVs 113 are exposed. However, any other suitable method of exposing the TSVs 113, such as a series of one or more etching processes, may also be utilized.

The contact pads 115 may be formed over and in electrical contact with the TSVs 113. The contact pads 115 may comprise aluminum, but other materials, such as copper, may also be used. The contact pads 115 may be formed using a deposition process, such as sputtering, to form a layer of material (not shown) and portions of the layer of material may then be removed through a suitable process (such as photolithographic masking and etching) to form the contact pads 115. However, any other suitable processes, such as plating processes, may be utilized.

The first external connectors 117 may be formed to provide conductive regions for contact between the contact pads 115 and other external devices (e.g., a printed circuit board—not separately illustrated). The first external connectors 117 may be conductive bumps (e.g., ball grid arrays, microbumps, etc.) or conductive pillars utilizing materials such as solder and copper. In an embodiment in which the first external connectors 117 are contact bumps, the first external connectors 117 may comprise a material such as tin, or other suitable materials, such as silver, lead-free tin, or copper. In an embodiment in which the first external connectors 117 are tin solder bumps, the first external connectors 117 may be formed by initially forming a layer of tin through such commonly used methods such as evaporation, electroplating, printing, solder transfer, ball placement, etc. to a thickness of, e.g., about 20 μm. Once a layer of tin has been formed on the structure, a reflow may be performed in order to shape the material into the desired bump shape.

Figure 2A:
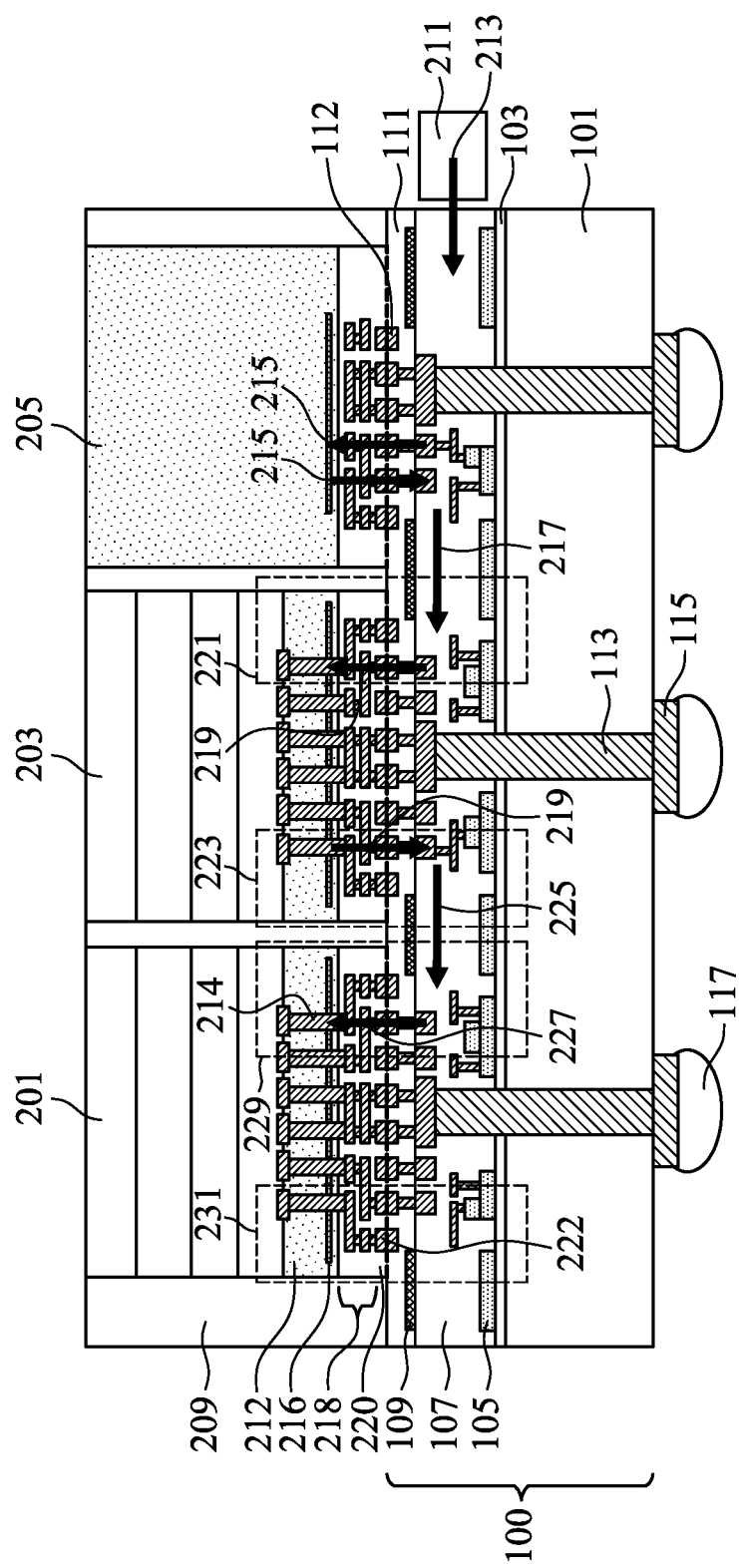
FIGS. 2A-2B illustrate placement of semiconductor devices onto the optical interposer, in accordance with some embodiments.
Figure 2B:
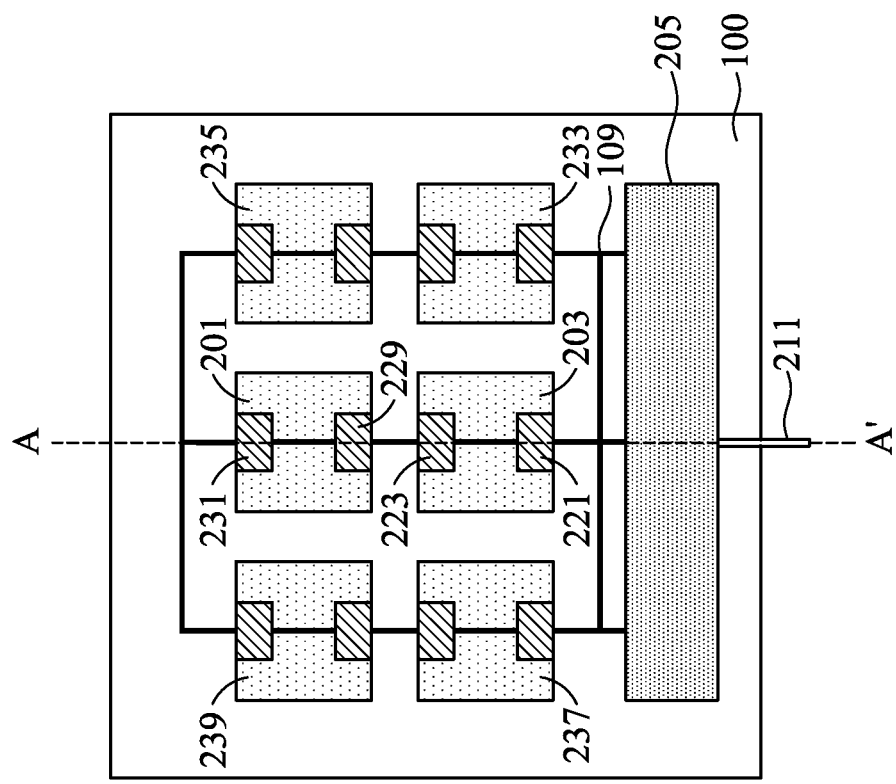

FIGS. 2A-2B illustrate a cross-sectional view and a top down view, respectively, after bonding of a first semiconductor device 201, a second semiconductor device 203, and a third semiconductor device 205 onto the optical interposer 100, wherein FIG. 2A illustrates a cross-sectional view along line A-A' in FIG. 2B. In some embodiments, the first semiconductor device 201 is an electronic integrated circuit (EIC—devices without optical devices) such as a stacked device that includes multiple, interconnected semiconductor substrates. For example, the integrated circuit die may be a memory device such as a high bandwidth memory (HBM) module, a hybrid memory cube (HMC) module, or the like that includes multiple stacked memory dies.

In such embodiments, the first semiconductor device 201 includes multiple semiconductor substrates 212 interconnected by second through-substrate vias (TSVs) 214, wherein FIG. 2A illustrates such structures for the bottom die within the module but not separately illustrating such structures for the other dies for clarity. Each of the semiconductor substrates 212 may (or may not) have a layer of active devices 216 and an overlying interconnect structure 218, a second bond layer 220 (similar to the first bond layer 111), and associated second bond pads 222 (similar to the first bond pads 112).

Of course, while the first semiconductor device 201 is a HBM module in one embodiment, the embodiments are not restricted to the first semiconductor device 201 being an HBM module. Rather, the first semiconductor device 201 may be any suitable semiconductor device, such as a processor die or other type of functional die. In particular embodiments the first semiconductor device 201 may be an xPU, a logic die, a 3DIC die, a CPU, a GPU, a SoC die, a MEMS die, combinations of these, or the like. Any suitable device with any suitable functionality, may be used, and all such devices are fully intended to be included within the scope of the embodiments.

Once the first semiconductor device 201 has been prepared, the first semiconductor device 201 may be bonded to the optical interposer 100. In an embodiment the first semiconductor device 201 may be bonded to the optical interposer 100 using, e.g., a system on integrated circuit (SoIC) bond such as a hybrid bonding process. In such an embodiment the first semiconductor device 201 is bonded to the first bond layer 111 of the optical interposer 100 by bonding both the first bond pads 112 to the second bond pads 222 and by bonding the first bond layer 111 to the second bond layer 220. In this embodiment the top surfaces of the first semiconductor device 201 and the optical interposer 100 may first be activated utilizing, e.g., a dry treatment, a wet treatment, a plasma treatment, exposure to an inert gas, exposure to $H_2$, exposure to $N_2$, exposure to $O_2$, or combinations thereof, as examples. However, any suitable activation process may be utilized.

After the activation process the first semiconductor device 201 and the optical interposer 100 may be cleaned using, e.g., a chemical rinse, and then the first semiconductor device 201 is aligned and placed into physical contact with the optical interposer 100. The first semiconductor device 201 and the optical interposer 100 are then subjected to thermal treatment and contact pressure to hybrid bond the first semiconductor device 201 and the optical interposer 100. For example, the first semiconductor device 201 and the optical interposer 100 may be subjected to a pressure of about 200 kPa or less, and a temperature between about 25° C. and about 250° C. to fuse the first semiconductor device 201 and the optical interposer 100. The first semiconductor device 201 and the optical interposer 100 may then be subjected to a temperature at or above the eutectic point for material of the first bond layers 111, e.g., between about 150° C. and about 650° C., to fuse the metal bond pads. In this manner, fusion of the first semiconductor device 201 and the optical interposer 100 forms a hybrid bonded device. In some embodiments, the bonded dies are baked, annealed, pressed, or otherwise treated to strengthen or finalize the bond.

Additionally, while the above description a hybrid bonding process, this is intended to be illustrative and is not intended to be limiting. In yet other embodiments, the optical interposer 100 may be bonded to the first semiconductor device 201 by direct surface bonding, metal-to-metal bonding, or another bonding process. A direct surface bonding process creates an oxide-to-oxide bond or substrate-to-substrate bond through a cleaning and/or surface activation process followed by applying pressure, heat and/or other bonding process steps to the joined surfaces. In other embodiments, the first semiconductor device 201 and the optical interposer 100 are bonded by metal-to-metal bonding that is achieved by fusing conductive elements. Any suitable bonding process may be utilized, and all such methods are fully intended to be included within the scope of the embodiments.

Additionally, in some embodiments, the electrical bonding that is present between the first semiconductor device 201 and the optical interposer 100 (e.g., the electrical connections between the first bond pads 112 and the second bond pads 222) are the paths that each signal (either optical or electrical) follows in order to communicate between the first semiconductor device 201 and the optical interposer 100. As such, in this particular embodiment electrical signals, but not optical signals, are communicated between the first semiconductor device 201 and the optical interposer 100. However, in other embodiments, optical signals may also be communicated between the first semiconductor device 201 and the optical interposer 100. Any combination of optical and electrical connections may be utilized, and all such combinations are fully intended to be included within the scope of the embodiments.

The second semiconductor device 203 may be similar to the first semiconductor device 201. For example, in an embodiment the second semiconductor device 203 may be a high bandwidth memory stack with a stack of multiple memory die interconnected by through silicon vias that extend through semiconductor substrates. However, in other embodiments the second semiconductor device 203 may be different from the first semiconductor device 201, such as by having a different structure (e.g., a single substrate) or by having a different functionality. All suitable combinations of the first semiconductor device 201 and the second semiconductor device 203 may be used, and all such combinations are fully intended to be included within the scope of the embodiments.

Further, the second semiconductor device 203 may be bonded to the optical interposer 100 in a similar fashion as the first semiconductor device 201. For example, the second semiconductor device 203 may be bonded to the optical interposer 100 using, e.g., a hybrid bonding process. However, any suitable bonding process, either the same as or different from the bonding process utilized to bond the first semiconductor device 201 to the optical interposer 100, may be used, and all such bonding processes are fully intended to be included within the scope of the described embodiments.

The third semiconductor device 205 may be, e.g., an input/output (I/O) device that is designed to work in conjunction with the first semiconductor device 201 and the second semiconductor device 203. For example, in some embodiments the third semiconductor device 205 may work to control signals entering and leaving the first semiconductor device 201 and the second semiconductor device 203, and also coordinating with signals entering and leaving the optical interposer 100 through, e.g., an optical fiber 211 (discussed further below). However, the third semiconductor device 205 may be any suitable semiconductor device, such as a CPU, a GPU, a memory, or the like.

The third semiconductor device 205 may be bonded to the optical interposer 100 in a similar fashion as the first semiconductor device 201. For example, the third semiconductor device 205 may be bonded to the optical interposer 100 using, e.g., a hybrid bonding process. However, any suitable bonding process, either the same as or different from the bonding process utilized to bond the first semiconductor device 201 to the optical interposer 100, may be used, and all such bonding processes are fully intended to be included within the scope of the described embodiments.

Once the first semiconductor device 201, the second semiconductor device 203, and the third semiconductor device 205 have been bonded to the optical interconnect, an encapsulant 209 is formed on and around the various components. In an embodiment, the encapsulant 209 may be a molding compound, epoxy, or the like. The encapsulant 209 may be applied by compression molding, transfer molding, or the like. The encapsulant 209 is further formed in gap regions between the first semiconductor device 201, the second semiconductor device 203, and the third semiconductor device 205. The encapsulant 209 may be applied in liquid or semi-liquid form and then subsequently cured.

A planarization process is performed on the encapsulant 209 once the encapsulant 209 has been placed. Once planarized, top surfaces of the encapsulant 209, the first semiconductor device 201, the second semiconductor device 203, and the third semiconductor device 205, are substantially coplanar after the planarization process within process variations. The planarization process may be, for example, a chemical-mechanical polish (CMP), a grinding process, or the like. In some embodiments, the planarization may be omitted.

An optical fiber 211 is utilized as an optical input/output port to the optical interposer 100. In an embodiment the optical fiber 211 is placed so as to optically couple the optical fiber 211 and an optical input such as an edge coupler (not separately illustrated in FIG. 2A) located within the second active layer 109. By positioning the optical fiber 211 adjacent to the edge coupler within the second active layer 109, optical signals leaving the optical fiber 211 are directed through the second active layer 109 of optical components. Similarly, the optical fiber 211 is positioned so that optical signals leaving the second active layer 109 of optical components is directed into the optical fiber 211 for transmission. However, any suitable location may be utilized.

The optical fiber 211 may be held in place using, e.g., an optical glue (not separately illustrated). In some embodiments, the optical glue comprises a polymer material such as epoxy-acrylate oligomers, and may have a refractive index between about 1 and about 3. However, any suitable material may be utilized.

FIG. 2B illustrates the top down view of the structure of FIG. 2A, with FIG. 2A illustrating a cross-sectional view of the structure of FIG. 2B along line A-A'. As can be seen in this top-down view, the second active layer 109 is arrayed in order to route optical signals from beneath the third semiconductor device 205 to beneath the first semiconductor device 201 and beneath the second semiconductor device 203. However, while the layout of the second active layer 109 that is illustrated in FIG. 2B is one such layout that may be utilized, any suitable layout and routing of the elements within the second active layer 109 may be utilized.

Returning now to FIG. 2A, there is illustrated arrows which represent a number of signals (both optical and electrical) which are received, sent, and routed throughout the optical interposer 100, the first semiconductor device 201, the second semiconductor device 203, and the third semiconductor device 205. These arrows represent a general direction that the signals are routed within and between the optical interposer 100, the first semiconductor device 201, the second semiconductor device 203, and the third semiconductor device 205, and do not necessarily represent the exact path that the signals travel through, e.g., individual waveguides and other components.

Looking first to the optical fiber 211, in operation the optical fiber 211 inputs first optical signals 213 into the optical interposer 100 (e.g., through an edge coupler located within the first active layer 105 or the second active layer 109). The optical interposer 100 receives the first optical signals 213, transforms the first optical signals 213 into first electrical signals 215, and then sends the first electrical signals 215 to the third semiconductor device 205 (e.g., the I/O device).

Once the third semiconductor device 205 receives the first electrical signals 215, the third semiconductor device 205 then processes the first electrical signals 215 and distributes the first electrical signals 215 back to the optical interposer 100 for routing to the second semiconductor device 203. For example, the third semiconductor device 205 will send the first electrical signals 215 (or signals derived from the first electrical signals 215) back to the optical interposer 100, where the first electrical signals 215 are converted back to second optical signals 217, and the second optical signals 217 are routed within the optical interposer 100 to a region related to the second semiconductor device 203. Once routed, the second optical signals 217 are re-converted to second electrical signals 219 and the second electrical signals 219 are sent to the second semiconductor device 203 through, e.g., a first I/O region 221 within the second semiconductor device 203 and the optical interposer 100. The first I/O region 221 can then distribute the second electrical signals 219 within the second semiconductor device 203 (e.g., within the HBM memory module), or else decide to send the second electrical signals 219 to the first semiconductor device 201. In such a fashion, the third semiconductor device 205 is operably connected to the second semiconductor device 203 through at least one of the optical components in the first active layer 105 and/or the second active layer 109.

In embodiments in which the second semiconductor device 203 decides to send the second electrical signals 219 to the first semiconductor device 201, the second semiconductor device 203 may have a second I/O region 223 which sends the second electrical signals 219 (or, if desired, signals derived from the second electrical signals 219) back to the optical interposer 100. Once in the optical interposer 100, the second electrical signals 219 may be converted into third optical signals 225. The third optical signals 225 are then routed through the optical interposer 100 to a region associated with the first semiconductor device 201. Once within the region associated with the first semiconductor device 201, the third optical signals 225 are then converted to third electrical signals 227 (the translation occurring within the optical interposer 100) and then the third electrical signals 227 are sent to the first semiconductor device 201 through, e.g., a third I/O region 229. The third I/O region 229 can then distribute the third electrical signals 227, or else send the third electrical signals to yet another device through, e.g., a fourth I/O region 231 that sends the third electrical signals 227 back to the optical interposer 100. In such a fashion, the third semiconductor device 205 is operably connected to the first semiconductor device 201 through at least one of the optical components in the first active layer 105 and/or the second active layer 109.

In such a manner, the optical interposer 100 is utilized in order to receive the first optical signals 213 from the optical fiber 211 and send the received first optical signals 213 through the third semiconductor device 205 (e.g., the I/O device) and to the first semiconductor device 201 and the second semiconductor device 203. At each stage the optical interposer 100 can receive the various signals, either electrical signals or optical signals, translate the signals into optical signals if desired, route the optical signals as desired, translate the optical signals into electrical signals, and then send the electrical signals to the desired components.

Further, and as illustrated in the top-down view of FIG. 2B, additional semiconductor devices can be added. As illustrated a fourth semiconductor device 233, a fifth semiconductor device 235, a sixth semiconductor device 237, and a seventh semiconductor device 239 are also bonded or otherwise connected to the optical interposer 100 in order to add additional capacity or functionality to the overall device. For example, in an embodiment in which the first semiconductor device 201 and the second semiconductor device 203 are memory devices, the fourth semiconductor device 233, the fifth semiconductor device 235, the sixth semiconductor device 237, and the seventh semiconductor device 239 may be additional memory devices. However, the additional semiconductor devices may be any suitable functionalities.

By utilizing the optical interposer 100 to receive the various optical and electrical signals, convert the signals as desired, and route the signals to the attached devices, a functional device can be manufactured which utilizes the high speed, low heat optical components. Additionally, by attaching additional devices to the optical interposer 100, the device may be scaled as desired. For example, in embodiments in which the first semiconductor device 201 and the second semiconductor device 203 are high bandwidth memory devices, the fourth semiconductor device 233, the fifth semiconductor device 235, the sixth semiconductor device 237, and the seventh semiconductor device 239 may be added as additional memory devices in order to scale the overall device and add additional memory capacity. Similarly, in embodiments in which the first semiconductor device 201 and the second semiconductor device 203 are processors (e.g., xPUs), the fourth semiconductor device 233, the fifth semiconductor device 235, the sixth semiconductor device 237, and the seventh semiconductor device 239 may be added as additional processors in order to scale the overall device and add additional processing capacity.

Figure 3:
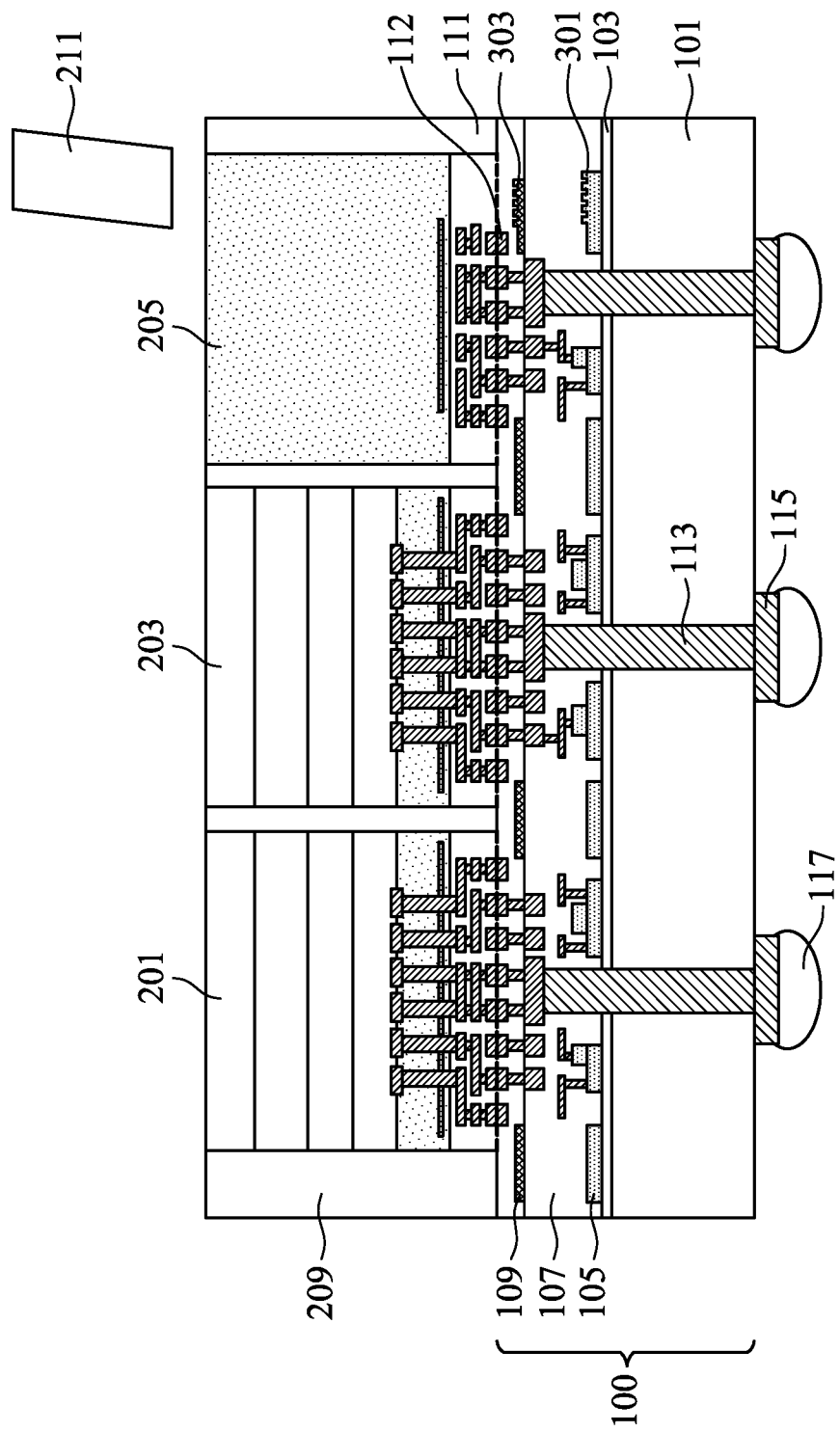
FIG. 3 illustrates usage of a grating coupler, in accordance with some embodiments.

FIG. 3 illustrates another embodiment of the structure illustrated in FIG. 2A, but in which a first grating coupler 301 and a second grating coupler 303 are utilized to receive signals from the optical fiber 211 or multiple optical fibers 211. In this embodiment the first grating coupler 301 may be used to receive and redirect incoming, off-plane signals from the optical fiber 211 into an adjacent, in-plane waveguide for transport into the first active layer 105 of optical components. In an embodiment the first grating coupler 301 can be formed using a photolithographic masking and etching process before or after a remainder of the patterning of the first active layer 105 of the optical components. However, any suitable structure and method of formation may be used.

The second grating coupler 303 may be used to receive signals from the optical fiber 211 for transport into the second active layer 109 of optical components. In an embodiment the second grating coupler 303 may be similar to the first grating coupler 301, such as by being a grating structure that directs incoming, off-plane signals into an adjacent waveguide, and in which the second grating coupler 303 may be formed using a photolithographic masking and etching process either before or after the patterning of the second active layer 109 of optical components. However, any suitable structure and any suitable method of manufacture may be utilized.

In this embodiment the optical fiber 211, instead of being coupled in plane with waveguides formed within the first active layer 105 and/or the second active layer 109, is coupled off-plane with the waveguides, such as by being coupled over the third semiconductor device 205. From this location, optical signals from the optical fiber 211 can be directed through the third semiconductor device 205 and towards either the first grating coupler 301 and/or the second grating coupler 303.

Additionally, while only a single optical fiber 211 is illustrated as being present within the illustrated embodiment, this is intended only to be illustrative and is not intended to be limiting. Rather, any suitable number of optical fibers 211, such as a separate, individual optical fiber for each of the first grating coupler 301 and the second grating coupler 303, may be utilized, and all such numbers of optical fibers 211 are fully intended to be included within the scope of the embodiments.

Figure 4:
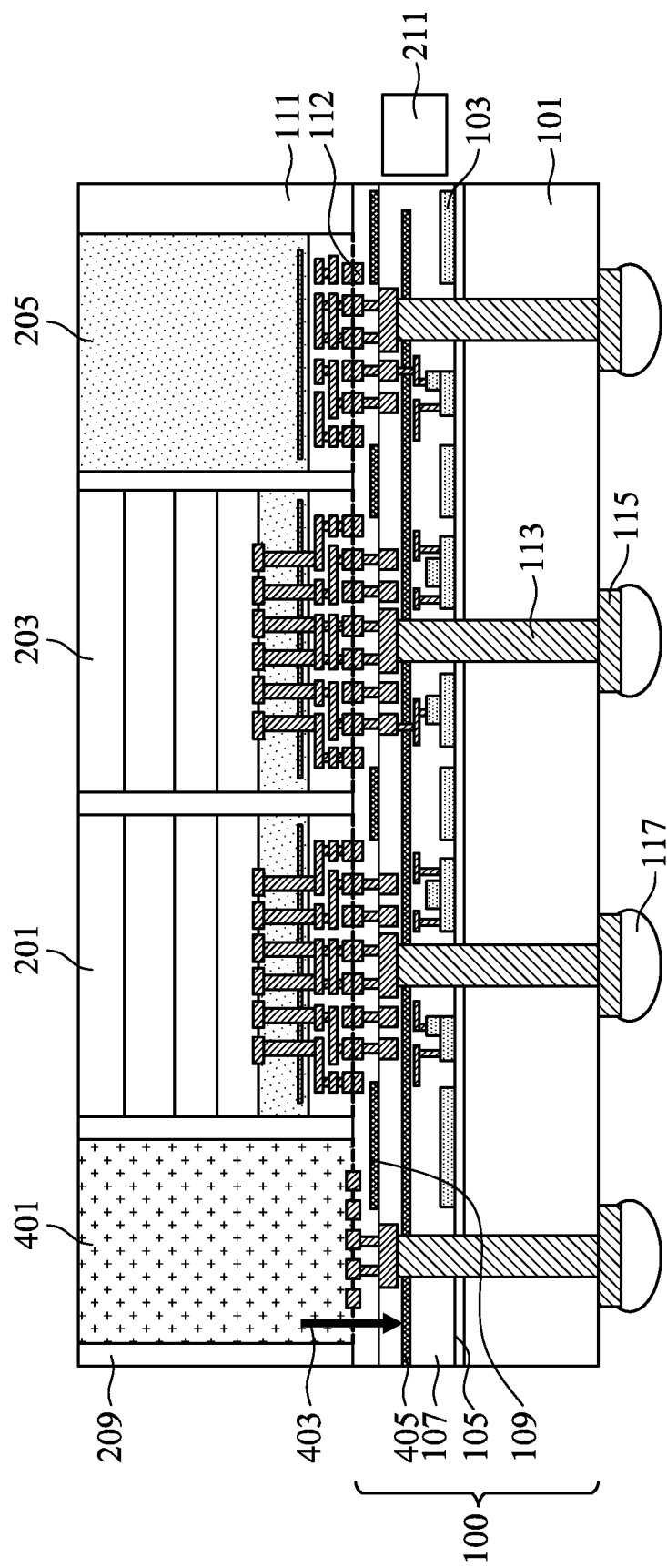
FIG. 4 illustrates placement of a laser die, in accordance with some embodiments.

FIG. 4 illustrates another embodiment of the structure illustrated in FIG. 2A above, but which additionally includes a laser die 401 in order to supply light and power to the optical interposer 100. In this embodiment, instead of or in addition to laser generators that are manufactured as part of the optical interposer 100 (e.g., on-interposer laser generators formed as part of either the first active layer 105 or the second active layer 109), a laser die 401 is manufactured and bonded to the optical interposer 100 in order to supply light and power to the optical interposer 100. In an embodiment the laser die 401 may be a bare laser die (e.g., a distributed feedback laser), a laser diode chip, combinations of these, or the like, which will generate one or more lasers 403 (e.g., lasers with different wavelengths) and then transmit the one or more different lasers 403 to a light emitting edge of the laser die 401, where it will exit the laser die 401.

The one or more different lasers 403 emitted from the laser die 401 are directed towards the optical interposer 100 and are received by the optical interposer 100 using, e.g., one or more grating couplers (not separately illustrated in FIG. 4) located within a third active layer 405 of the optical interposer 100. In an embodiment the third active layer 405 of the optical interposer 100 may be similar to the first active layer 105 of optical components and the second active layer 109 of optical components, and may comprise couplers (e.g., optical couplers), waveguides, optical switches, amplifiers, multiplexors, demultiplexors, optical-to-electrical converters, electrical-to-optical converters, lasers, combinations of these, or the like. The third active layer 405 may be manufactured using similar methods and processes as described above with respect to the first active layer 105 and the second active layer 109, such as by depositing a layer of silicon nitride, patterning the layer of silicon nitride into couplers and waveguides, and then performing any further additional processing to form a remainder of the desired devices within the third active layer 405 of optical components. However, any suitable devices and methods may be manufactured as part of the third active layer 405.

Figure 5:
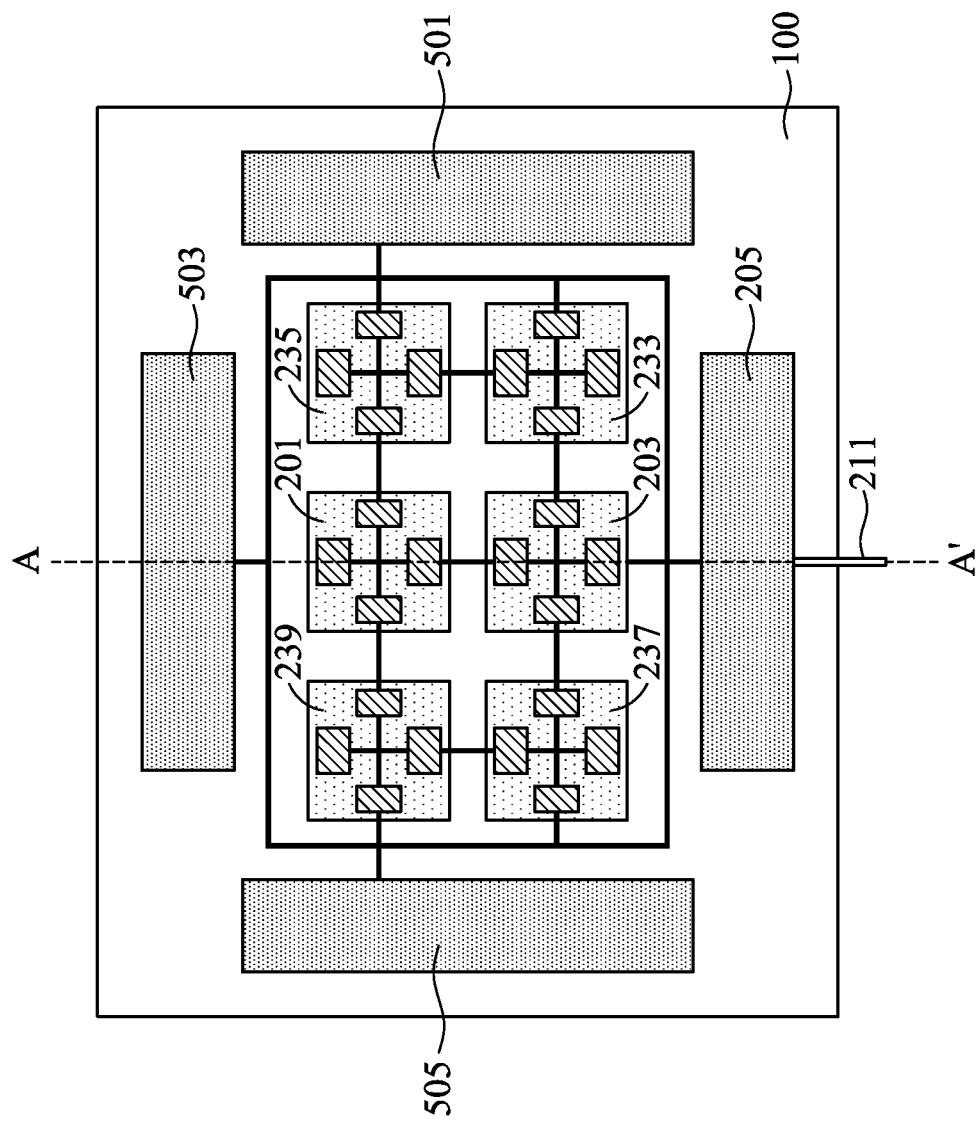
FIG. 5 illustrates the use of multiple input/output devices, in accordance with some embodiments.

FIG. 5 illustrates yet another embodiment wherein not only are the functional devices (e.g., the first semiconductor device 201 and the second semiconductor device 203) scaled to provide additional functionality, but the I/O devices (e.g., the third semiconductor device 205) are similarly scaled. As such, in addition to the third semiconductor device 205 (e.g., the first I/O device discussed above with respect to FIGS. 2A-2B), the embodiment additionally includes an eighth semiconductor device 501, a ninth semiconductor device 503, and a tenth semiconductor device 505, wherein each of the eighth semiconductor device 501, the ninth semiconductor device 503, and the tenth semiconductor device 505 are also I/O devices that help to control signals into and out of the various functional devices (e.g., the first semiconductor device 201, the second semiconductor device 203, the fourth semiconductor device 233, the fifth semiconductor device 235, the sixth semiconductor device 237, and the seventh semiconductor device 239, etc.).

In this embodiment, the optical interposer 100 initially receives the first optical signals 213 from the optical fiber 211 and translates the first optical signals 213 into the first electrical signals 215 before sending the first electrical signals 215 to the third semiconductor device 205 (e.g., the first I/O device). The third semiconductor device 205 then sends the first electrical signals 215 to the functional devices (e.g., the first semiconductor device 201) and/or also to the other I/O devices (e.g., the eighth semiconductor device 501, the ninth semiconductor device 503, and the tenth semiconductor device 505), by sending the first electrical signals 215 to the optical interposer 100, which will convert the first electrical signals 215 to the second optical signals 217 before routing them towards the various devices, and then converting the second optical signals 217 to the second electrical signals 219 before sending them into the overlying devices.

By scaling the number of I/O devices, all of the I/O devices (e.g., the third semiconductor device 205, the eighth semiconductor device 501, the ninth semiconductor device 503, and the tenth semiconductor device 505) can work in conjunction with each other to control sending and receiving signals into and out of the functional devices (e.g., the first semiconductor device 201, the second semiconductor device 203, the fourth semiconductor device 233, the fifth semiconductor device 235, the sixth semiconductor device 237, and the seventh semiconductor device 239). By scaling the I/O devices in addition to the functional devices, the overall control of the device can be distributed as desired in order to provide for the most efficient traffic into and out of the functional devices regardless of how many functional devices are utilized.

Figure 6A:
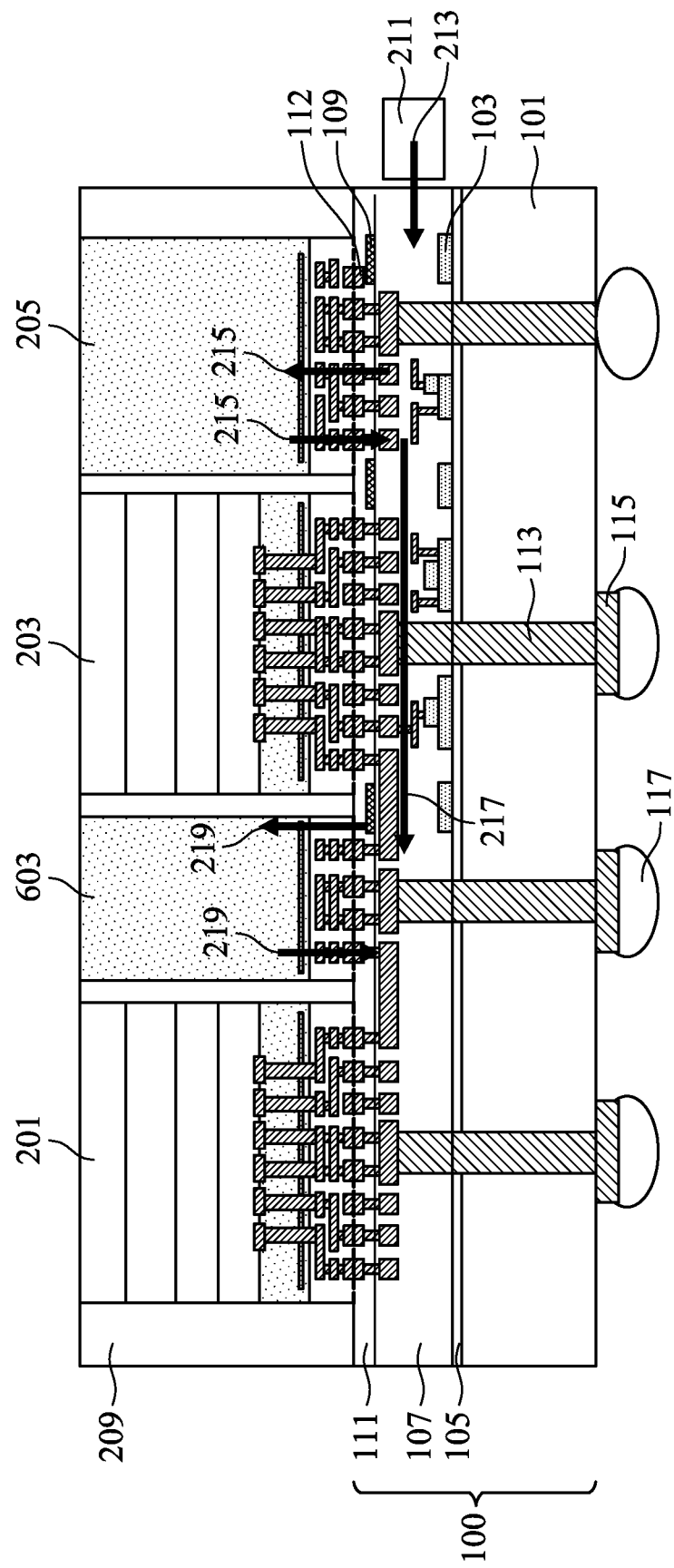
FIGS. 6A-6B illustrate internal input/output devices, in accordance with some embodiments.
Figure 6B:
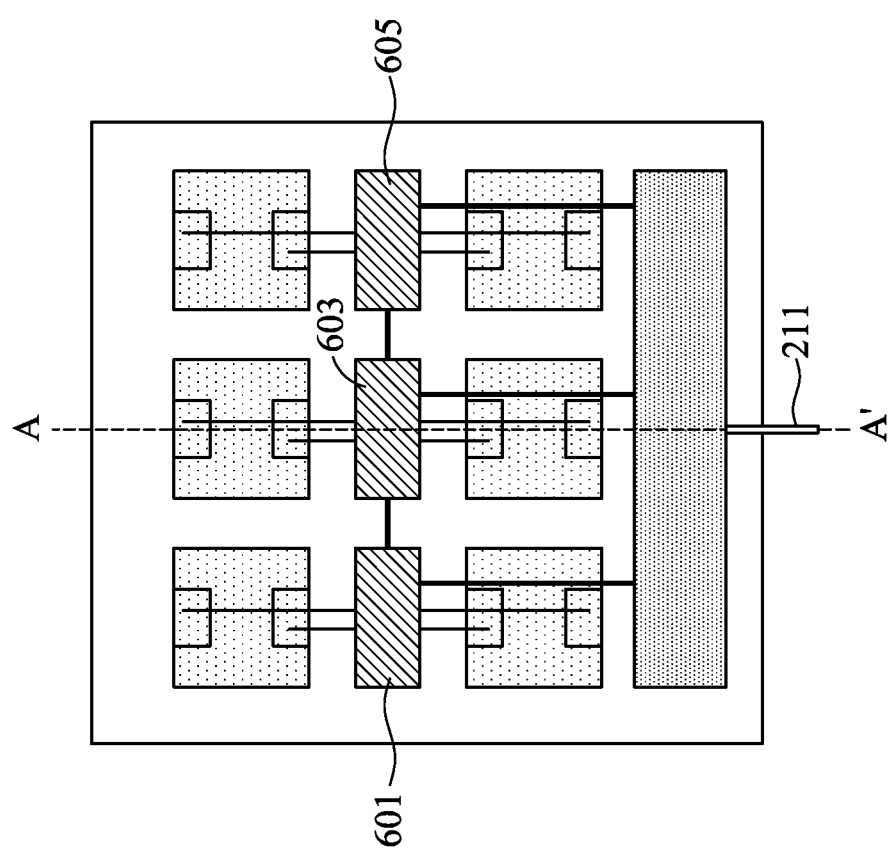

FIGS. 6A-6B illustrate yet another embodiment which utilizes the third semiconductor device 205 as an external I/O die and also utilizes a first internal I/O die 601, a second internal I/O die 603, and a third internal I/O die 605 in order to connect the third semiconductor device 305 and the functional dies (e.g., the first semiconductor device 201 and the second semiconductor device 203), with FIG. 6A illustrating a cross-sectional view of FIG. 6B along line A-A'. In this embodiment, the optical interposer 100 initially receives the first optical signals 213 from the optical fiber 211 and translates the first optical signals into the first electrical signals 215 before sending the first electrical signals 215 to the third semiconductor device 205 (e.g., the first I/O device). The third semiconductor device 205 then sends the first electrical signals 215 to the first internal I/O die 601, the second internal I/O die 603, and the third internal I/O die 605 by sending the first electrical signals 215 to the optical interposer 100, which converts the first electrical signals 215 to the second optical signals 217 before routing them towards the various devices.

Once the second optical signals 217 have been routed to the internal I/O devices (e.g., the first internal I/O die 601, a second internal I/O die 603, and a third internal I/O die 605), the optical interposer 100 will change the second optical signals 217 to the second electrical signals 219 before routing the second electrical signals 219 to the internal I/O devices. The internal I/O devices then control the routing of the second electrical signals 219 towards the individual functional devices (e.g., the first semiconductor device 201, the second semiconductor device 203, etc.). In a particular embodiment each of the internal I/O devices controls signals to and/or from two of the functional devices, although any suitable number of devices may be used.

However, in this embodiment, when the internal I/O devices send the second electrical signals 219 towards the individual functional devices, the internal I/O devices send the second electrical signals through conductive portions of the optical interposer 100 without the optical interposer 100 translating the second electrical signals into optical signals. As such, the internal I/O devices are electrically connected to the functional devices without the need for conversion to optical signals.

By utilizing the optical interposer 100, a disaggregated high performance computing device can be manufactured using an efficient combination of optical signals and electrical signals in order to route these signals between the various devices. For example, optical signals may be received, converted to electrical signals, and then combinations of optical and electrical signals can be used to route the desired signals to the functional devices. With such an efficient system, additional devices may be added and the device may be scaled to provide as much capacity as desired.

In accordance with an embodiment, a method of manufacturing a semiconductor device includes: receiving a photonic interposer, the photonic interposer comprising: at least one optical input; and electrical external connections; bonding a first semiconductor device to a first set of the electrical external connections; bonding a second semiconductor device to a second set of the electrical external connections; and bonding a first I/O semiconductor device to a third set of the electrical external connections, wherein the first I/O semiconductor device is operably connected to both the first semiconductor device and the second semiconductor device through at least one first optical component. In an embodiment, the first semiconductor device is a high bandwidth memory device. In an embodiment, the first semiconductor device is a processing unit. In an embodiment, the method further includes: bonding a second I/O semiconductor device to a fourth set of the electrical external connections; bonding a third semiconductor device to a fifth set of the electrical external connections; and bonding a fourth semiconductor device to a sixth set of electrical external connections, wherein the second I/O semiconductor device is operably connected to both the third semiconductor device and the fourth semiconductor device through at least one second optical component. In an embodiment the method includes bonding a laser die to a fourth set of the electrical external connections. In an embodiment the method further includes: bonding a second I/O semiconductor device to a fourth set of the electrical external connections; bonding a third semiconductor device to a fifth set of the electrical external connections; and bonding a fourth semiconductor device to a sixth set of the electrical external connections, wherein the second I/O semiconductor device is operably connected to both the third semiconductor device and the fourth semiconductor device without passing through an optical component. In an embodiment, after the bonding the second I/O semiconductor device, the second I/O semiconductor device is physically located between the third semiconductor device and the fourth semiconductor device.

In accordance with another embodiment, a method of transmitting information includes: receiving a first optical signal 213 in an optical interposer 100; converting the first optical signal 213 to a first electrical signal 215 in the optical interposer 100; sending the first electrical signal 215 to a first I/O die 205; sending a second electrical signal 215 from the first I/O die 205 to the optical interposer 100; converting the second electrical signal 215 to a second optical signal 217; and routing the second optical signal 217 to a region beneath a first semiconductor device 203. In an embodiment the method further includes: converting the second optical signal to a third electrical signal; and sending the third electrical signal to the first semiconductor device. In an embodiment the first semiconductor device is a high bandwidth memory device. In an embodiment the first semiconductor device is a processing unit. In an embodiment the method further includes receiving a laser from a laser die bonded to the optical interposer. In an embodiment the method further includes: converting the second optical signal to a third electrical signal; and sending the third electrical signal to a second I/O die. In an embodiment the method further includes sending a fourth electrical signal from the second I/O die to a first semiconductor device without converting the fourth electrical signal into an optical signal.

In accordance with yet another embodiment, a semiconductor device includes: an optical interposer 100; a first electronic integrated circuit die 201 electrically connected to the optical interposer 100; a second electronic integrated circuit die 203 electrically connected to the optical interposer 100; and a first I/O device 205 electrically connected to the optical interposer 100. In an embodiment the semiconductor device further includes a laser die electrically and optically connected to the optical interposer. In an embodiment the semiconductor device further includes a second I/O device electrically connected to the optical interposer and at least partially optically connected to the first I/O device through the optical interposer. In an embodiment the second I/O device is fully electrically connected to a third electronic integrated circuit die, wherein the third electronic integrated circuit die is electrically connected to the optical interposer. In an embodiment the second I/O device is physically located between the third electronic integrated circuit die and a fourth electronic integrated circuit die. In an embodiment the semiconductor device further includes an optical fiber attached over the first I/O device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device, the method comprising:
   receiving a photonic interposer, the photonic interposer comprising:
      at least one optical input; and
      electrical external connections;
   bonding a first semiconductor device to a first set of the electrical external connections;
   bonding a second semiconductor device to a second set of the electrical external connections;
   bonding a third semiconductor device to a third set of the electrical external connections;
   bonding a first I/O semiconductor device to a fourth set of the electrical external connections, wherein the first I/O semiconductor device is operably connected to both the first semiconductor device and the second semiconductor device through at least one first optical component; and
   bonding a second I/O semiconductor device to a fifth set of the electrical external connections, wherein the second I/O semiconductor device is fully electrically connected to the third semiconductor device.

2. The method of claim 1, wherein the first semiconductor device is a high bandwidth memory device.

3. The method of claim 1, wherein the first semiconductor device is a processing unit.

4. The method of claim 1, further comprising:
   bonding a fourth semiconductor device to a sixth set of the electrical external connections, wherein the second I/O semiconductor device is operably connected to the fourth semiconductor device through at least one second optical component.

5. The method of claim 1, further comprising bonding a laser die to a sixth set of the electrical external connections.

6. The method of claim 1, further comprising:
   bonding a fourth semiconductor device to a sixth set of the electrical external connections, wherein the second I/O semiconductor device is operably connected to the fourth semiconductor device without passing through an optical component.

7. The method of claim 6, wherein after the bonding the second I/O semiconductor device, the second I/O semiconductor device is physically located between the third semiconductor device and the fourth semiconductor device.

8. A method of transmitting information, the method comprising:
   receiving a first optical signal in an optical interposer;
   converting the first optical signal to a first electrical signal in the optical interposer;
   sending the first electrical signal to a first I/O die;
   sending a second electrical signal from the first I/O die to the optical interposer;
   converting the second electrical signal to a second optical signal;
   routing the second optical signal to a region beneath a first semiconductor device, the first semiconductor device being adjacent to a second semiconductor device and a third semiconductor device, the second semiconductor device and the third semiconductor device being electrically connected to the optical interposer;
   routing a third optical signal from the first I/O die to a second I/O die through the optical interposer; and
   routing a third electrical signal from the second I/O die to the third semiconductor device.

9. The method of claim 8, further comprising:
   converting the second optical signal to a fourth electrical signal; and
   sending the fourth electrical signal to the first semiconductor device.

10. The method of claim 8, wherein the first semiconductor device is a high bandwidth memory device.

11. The method of claim 8, wherein the first semiconductor device is a processing unit.

12. The method of claim 8, further comprising receiving a laser from a laser die bonded to the optical interposer.

13. The method of claim 8, further comprising:
   converting the second optical signal to a fourth electrical signal; and
   sending the fourth electrical signal to a third I/O die.

14. The method of claim 13, further comprising sending a fifth electrical signal from the third I/O die to the first semiconductor device without converting the fifth electrical signal into an optical signal.

15. A semiconductor device comprising:
   an optical interposer;

a first electronic integrated circuit die electrically connected to the optical interposer;
a second electronic integrated circuit die electrically connected to the optical interposer;
a first I/O device electrically connected to the optical interposer; and
a second I/O device electrically connected to the optical interposer and at least partially optically connected to the first I/O device through the optical interposer, wherein the second I/O device is fully electrically connected to a third electronic integrated circuit die, wherein the third electronic integrated circuit die is electrically connected to the optical interposer.

16. The semiconductor device of claim 15, further comprising a laser die electrically and optically connected to the optical interposer.

17. The semiconductor device of claim 15, wherein the second I/O device is physically located between the third electronic integrated circuit die and a fourth electronic integrated circuit die.

18. The semiconductor device of claim 15, further comprising an optical fiber attached over the first I/O device.

19. The semiconductor device of claim 15, further comprising an optical fiber attached to the optical interposer.

20. The semiconductor device of claim 15, wherein the first electronic integrated circuit die is a stacked high bandwidth memory module.

* * * * *